Figure 1:
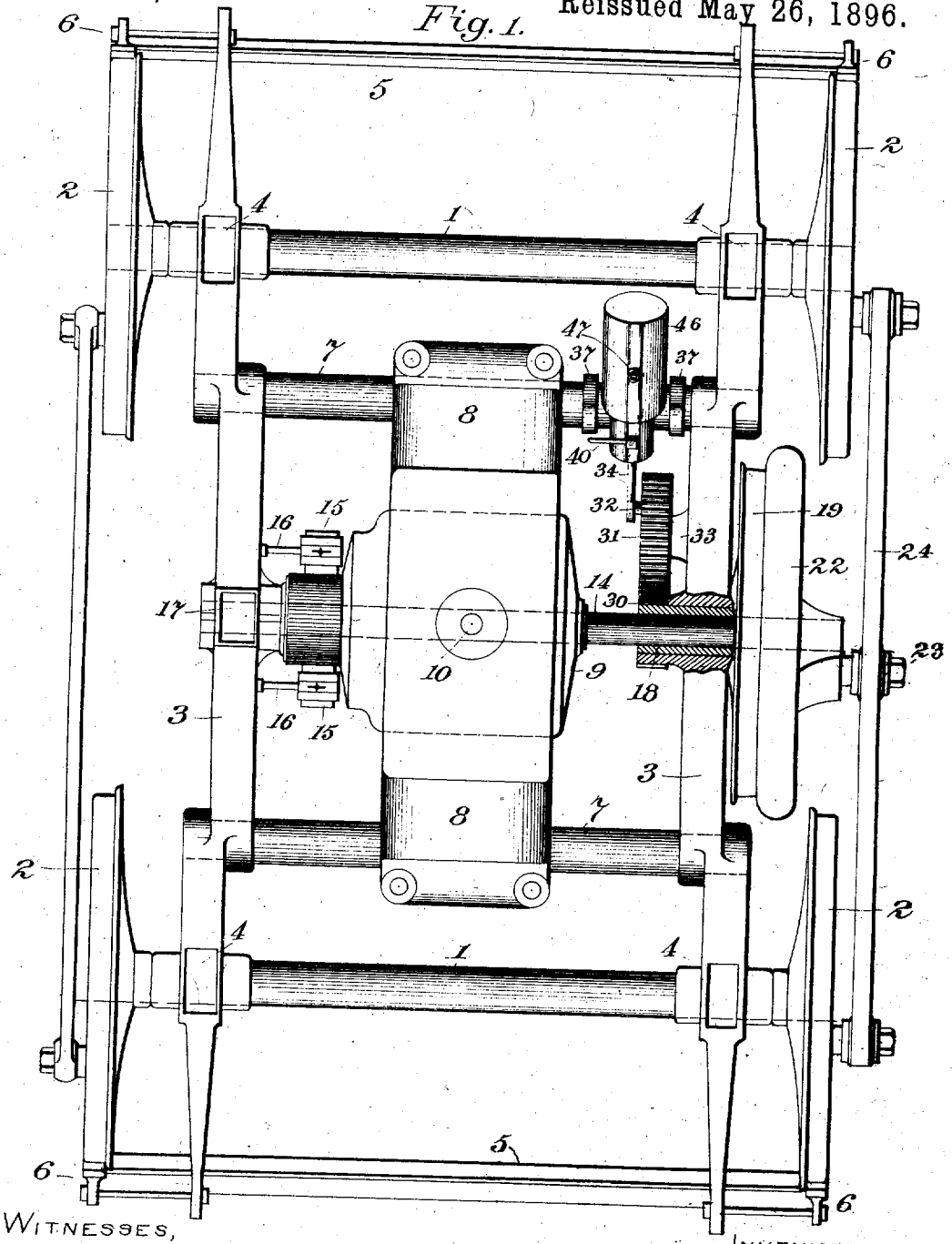
Figures 2, 3, 4:
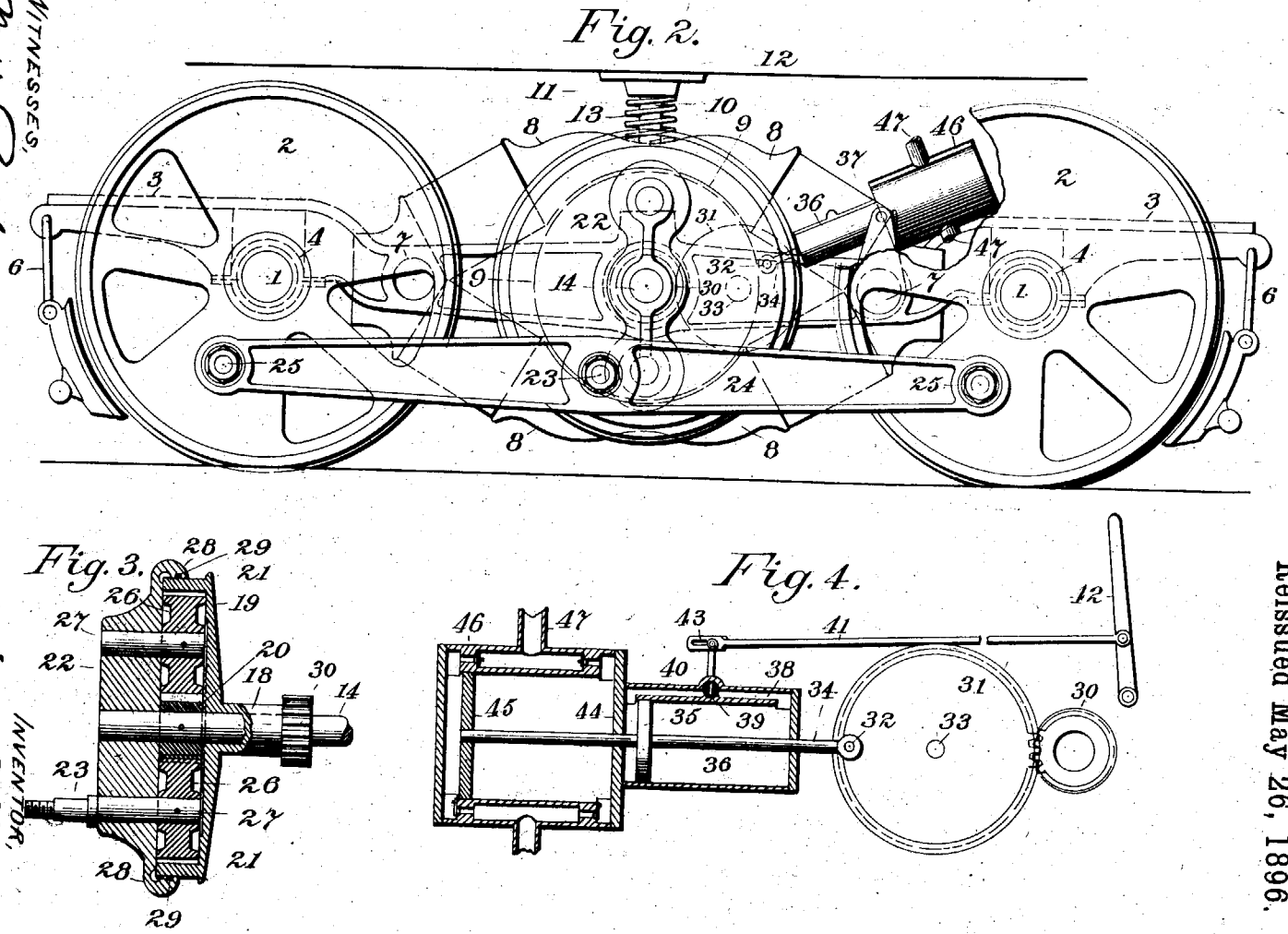
Figure 5:
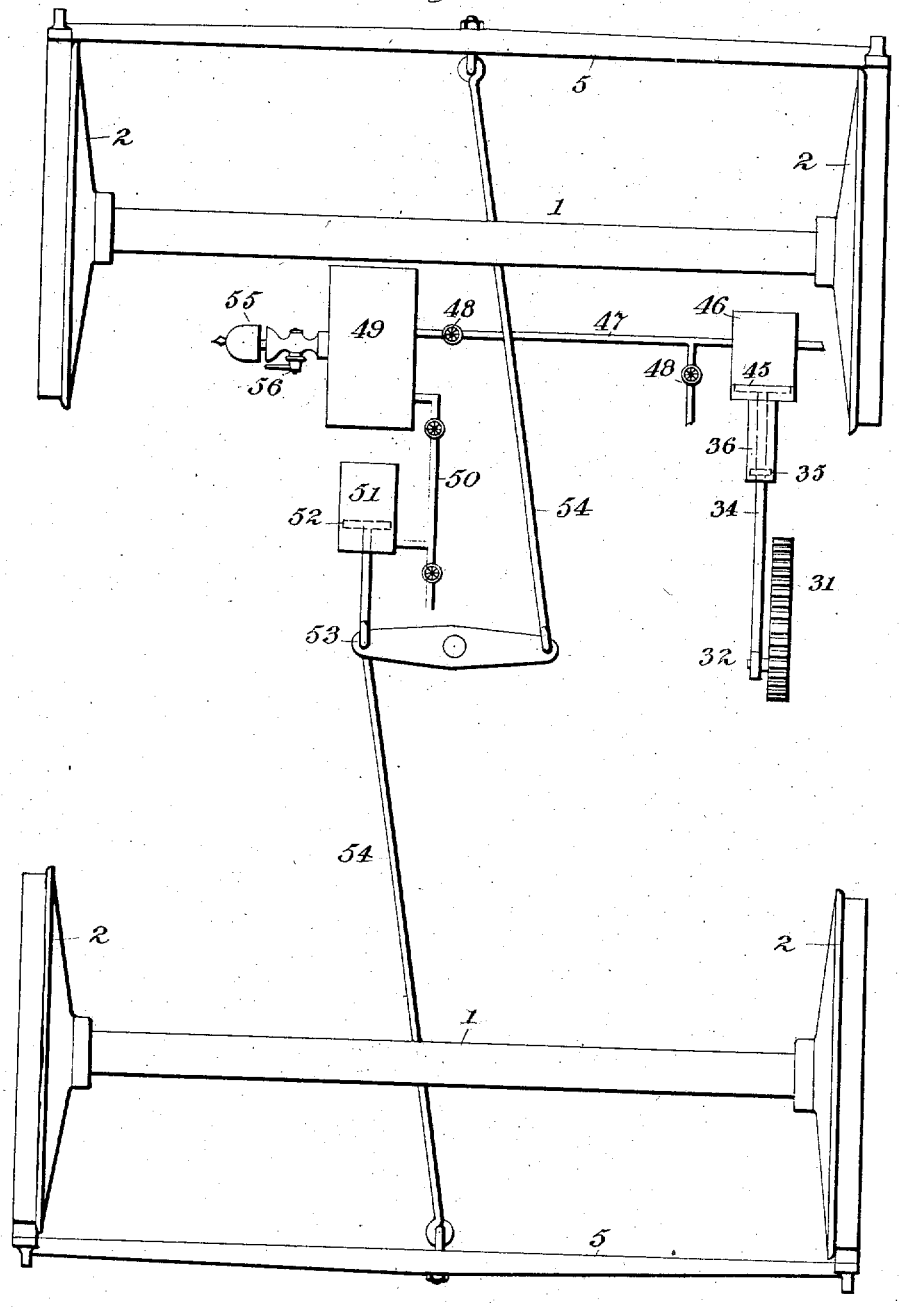

4 Sheets—Sheet 1.

J. C. HENRY.

ELECTRIC LOCOMOTIVE.

No. 11,543. Reissued May 26, 1896.

WITNESSES,

W. H. Pumphrey,

M. V. Bidgood

INVENTOR,

JOHN C. HENRY,

BY

HIS ATTORNEYS.

J. C. HENRY.

4 Sheets—Sheet 2.

ELECTRIC LOCOMOTIVE.

No. 11,543.

Reissued May 26, 1896.

WITNESSES,

W. H. Pumphrey.

Jas. V. Bidgood

INVENTOR,

JOHN C. HENRY,

BY

HIS ATTORNEYS.

J. C. HENRY.

ELECTRIC LOCOMOTIVE.

No. 11,543.

Reissued May 26, 1896.

WITNESSES,

W. H. Humphrey

M. V. Bidgood

INVENTOR,

BY JOHN C. HENRY,

HIS ATTORNEYS.

4 Sheets—Sheet 4.
J. C. HENRY.
ELECTRIC LOCOMOTIVE.
No. 11,543.
Reissued May 26, 1896.
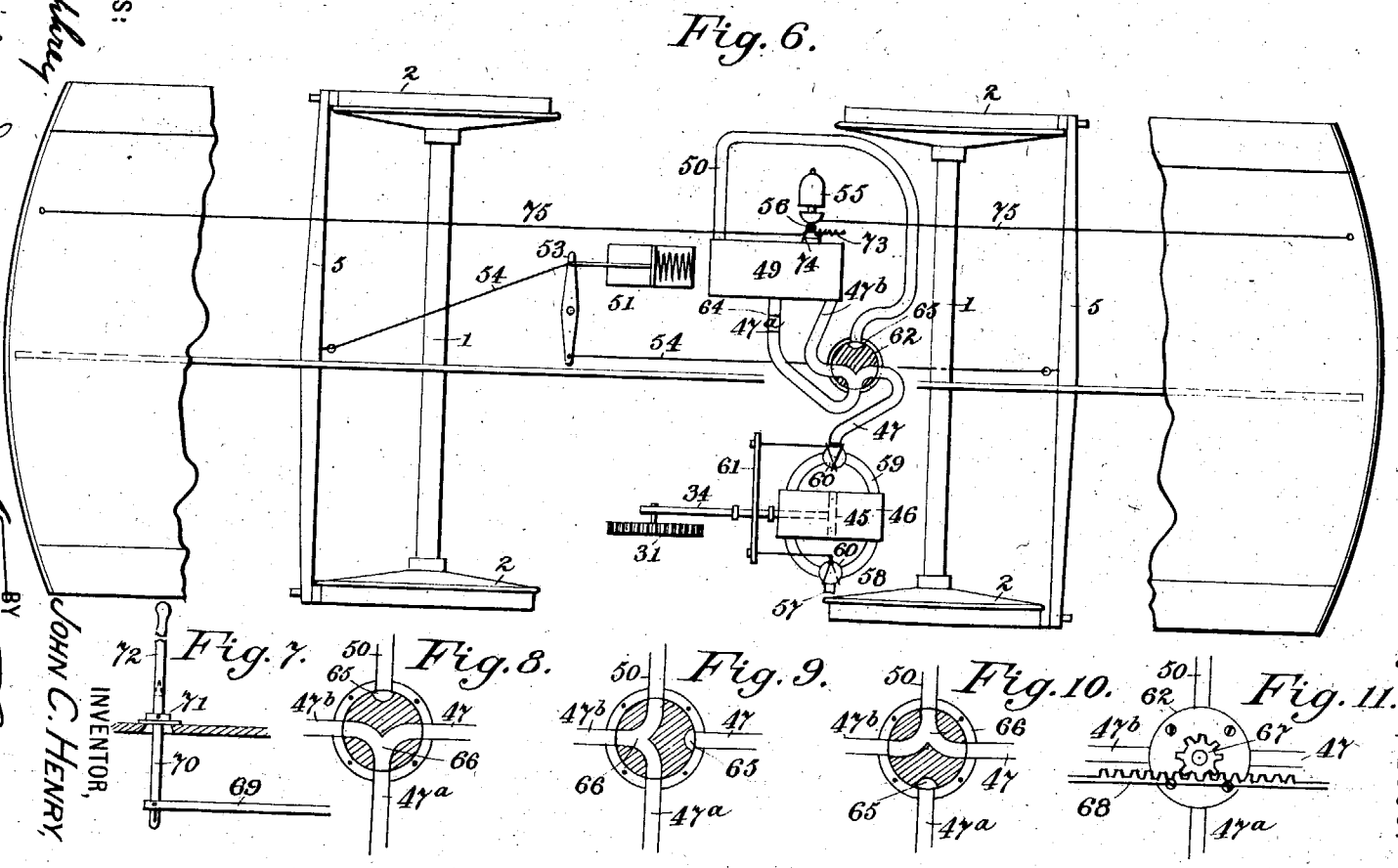
WITNESSES:
M. H. Humphrey
M. V. Bidgood
INVENTOR,
JOHN C. HENRY,
BY
Wright Brothers
HIS ATTORNEYS.

UNITED STATES PATENT OFFICE.

JOHN C. HENRY, OF DENVER, COLORADO.

ELECTRIC LOCOMOTIVE.

SPECIFICATION forming part of Reissued Letters Patent No. 11,543, dated May 26, 1896.

Original No. 509,311, dated November 21, 1893. Application for reissue filed February 24, 1896. Serial No. 580,588.

*To all whom it may concern:*

Be it known that I, JOHN C. HENRY, a citizen of the United States, formerly of New York, N. Y., now residing at Denver, county of Arapahoe, and State of Colorado, have invented certain new and useful Improvements in Electric Locomotives, of which the following is a specification.

My present invention comprises certain improvements in the differential power-transmitting mechanism and the yielding abutment controlling the same for regulating the speed.

In order that my invention may be fully understood, I will first describe the same with reference to the accompanying drawings and afterward point out with more particularity the novelty in the annexed claims.

In said drawings, Figure I is a plan view of a motor-truck embodying my improvements. Fig. II is a side elevation of the same, one wheel being partly broken to show the clutch and brake mechanism. Fig. III is an axial sectional view of the epicycle gearing. Fig. IV is a sectional view of the clutch and brake mechanism. Fig. V is a plan of the truck with motor removed, illustrating the clutch and brake mechanism. Fig. VI is a plan view, partly diagrammatic, of parts of the motor-truck and car-platforms, illustrating the application thereto of my improved air-brake and other parts. Fig. VII is a detail view showing the operating-lever or the three-way valve. Figs. VIII, IX, and X are sectional views illustrating three positions of said valve. Fig. XI is a detail plan view of the three-way-valve casing and its operating mechanism adjacent thereto.

The axles 1 of track-wheels 2 are joined by rigid longitudinal bars 3, having inside bearings 4 on the axles. The brake-beams 5 are hung by links 6 from the projecting ends of the bars 3. Cross-bars 7 tie the longitudinal bars 3 together, and on them the field-magnets 8 of the motor are hung at their neutral points. Such field-magnets are preferably arranged elliptically, as shown, about the armature 9, providing a strong double arch. The top of the upper arch of the field-magnets bears a center pin 10, which may be cast in one with the core and which enters a socket-plate 11 on the car-body, (indicated at 12.) The spring 13, placed between the field-magnet core and plate 11, affords a yielding support to the car-body. The weight of the car-body thus rests on the motor field-magnets and thence on the truck-frame, so that, in effect, the field-magnets form a part of such frame and add to its rigidity. The armature-shaft 14 is carried in bearings in the center of the bars 3 and midway between the axles. The commutator-brushes 15 are supported by arms or brackets 16 from one bar 3, and the support of the armature-shaft in this bar may be an ordinary boxing 17. At the other side of the truck the said shaft passes through a sleeve 18, which is formed on or rigidly fixed to the internal gear 19 of my planetary power-transmitting and speed-reducing gear. Such gear comprises the internal gear 19, in which the armature-shaft turns freely and which itself turns by its sleeve 18 in its bearing in the bar 3; the pinion 20, keyed or pinned to the armature-shaft in the plane of the teeth 21 of gear 19; the disk 22, free on the end of the armature-shaft and bearing a wrist-pin 23, engaging the center of a rigid connecting-rod 24, in the ends of which engage wrist-pins 25 on the car-wheels, and intermediate pinions 26, keyed or pinned to pins 27, mounted so as to rotate in disk 22. The disk 22 has a curved flange 28 surrounding the internal gear 19, and a packing-ring 29, of any suitable material, interposed between said flange and gear, excludes dust from the gearing and renders it noiseless and capable of retaining lubricants.

The operation of the gearing is as follows: The armature is a constant-running one, preferably of slow speed. While the current is on, therefore, the shaft 14 and its pinion 20 revolve constantly and drive the intermediate pinions 26. If now the internal gear 19 be held fast, the intermediate pinions 26 will travel around in it, carrying with them the disk 22, its wrist 23, and the connecting-rod 24 and turning the car-wheels, so that so long as the internal gear is locked the car will move in the direction of rotation of the armature. I characterize this arrangement of the internal gear and the means whereby it may be held fast or let run free as a "slip-support," the idea being that the internal gear may be fixedly held or allowed to run freely on its support or to slip thereon under any desired regulatable frictional resistance.

The means for holding the gear fast or allowing it to run free is what I refer to in the claims as a "yielding abutment," and as herein illustrated it comprises an oscillating cylinder adapted to contain water and having a return-passage between its ends, a piston in said cylinder, and a valve, manually controllable, in said passage, for arresting, more or less, or allowing free motion to the said liquid.

To hold the gear and release it as much as and when desired, I have shown in my application, Serial No. 473,583, filed May 9, 1893, a clutch and friction brake apparatus. In the present one I adapt to this use a liquid-clutch, which may or may not be combined, as herein shown, with an air or vacuum brake for stopping the car. Said liquid-clutch comprises a pinion 30, keyed to the sleeve 18 of the internal gear, a spur-wheel 31, having wrist 32 and running on a stud or pin 33, projecting from one of the bars 3, a plunger-rod 34, having one end pivoted on said wrist and bearing on the other a plunger 35, a cylinder 36, in which said plunger plays, hung so as to oscillate in brackets 37 or other support on the truck-frame, and having a gateway or by-path 38, connecting its opposite ends, and a valve 39 in said path controlled by an arm 40, which is connected by rod 41 with a lever or levers 42 on one or both car-platforms. Any suitable arrangement may be adopted to prevent the oscillation of the valve 39 in the by-path in synchronism with the oscillation of the cylinder. In order that said valve may move with the cylinder in its oscillations, and may nevertheless be shifted by movement of the lever or levers 42, the connection of the rod 41 to the arm 40 may, for example, be by pin and slot 43, as shown. By shifting one of the levers 42 the valve 39 may be either opened or closed. If opened, free passage is allowed through the by-path for the liquid which fills the cylinder and by-path, and the movement of the plunger will not be materially resisted by the liquid. The rotation of the train of gears and pinions 20, 26, 19, 30, and 31 under the action of the armature will be free and unresisted, so that the armature will turn and actuate such train of gears without driving the car; but if by the shifting of one of the levers 42 the valve 39 be closed the flow of the liquid is arrested, stopping the movement of the plunger and locking the train of gears 19, 30, and 31, so that, as before described, the intermediate pinions 26, traveling on the internal gear 19, will carry with them the disk 22 and its accompanying reciprocating connection with the car-wheels, thus propelling the car at the full speed corresponding to the maximum speed of rotation of the armature. It will be seen that opening the valve stops the movement of the car and allows the armature to operate continuously. Closing the valve moves the car with a fixed connection. Between these two extremes any desired speed of movement of the car is attained by a corresponding opening of the valve and removal, therefore, of resistance to the movement of the plunger. I describe this variable lock or clutch for my differential gear, and hereinafter refer to it in the claims as a "yielding liquid abutment." In connection with this yielding liquid abutment (and preferably actuated by the rigid connection therewith herein shown) is an air or vacuum brake, which I will now describe. In this connection it is noted that for the reason that it is desirable that both the air-pump of the brake system and the plunger of the yielding abutment be driven at slow speed, so as to act most efficiently and with less friction, the pinion and gear 30 and 31 are made, preferably, of the proportions herein shown—that is to say, the gear 31 is made of a size larger than the pinion 30, corresponding to the reduction in speed desired.

In the application of my brake herein shown the plunger-rod 34 is continued through the end 44 of the cylinder 36 and bears the plunger 45 of the air-pump 46, which has usual connecting-pipes 47 (controlled by valves 48) with reservoir 49, valved pipe 50, and brake-cylinder 51. The plunger 52 of such brake-cylinder is connected to brake-lever 53, which is hung from any suitable part of the car or truck and has usual rods 54, connected to the brake-beams 5. Connected to the reservoir 49 I place a whistle 55, which is under the control of valve 56 at the motorman's hand on either platform of the car. Seeing that the plunger 45 with its positively-connected mechanism is in this device only in action while the car is standing still or moving at reduced speed, it is only at such times that energy is absorbed in operating the air-pump of the brake system.

In Figs. VI to XI, I have illustrated a form of my invention in which the liquid-pump is omitted and the motion of the gear 31 is transmitted by rod 34 directly to the piston 45 in the cylinder of the air-pump 46. 57 is the air-inlet of the air-pump, having ports 58 connecting the opposite ends of the said pump. Discharge-ports 59 of the pump connect with the pipe 47. Reversing-valves are shown at 60, having the cross-head 61 under control of the piston-rod 34. The valves are reversed at the end of each stroke, and during the running of the gear 31 a practically constant compression of air through the pipe 47 is effected. The reservoir is shown at 49, having inlet-pipe $47^a$ and combined inlet and discharge pipe $47^b$. The brake-cylinder is shown at 51, having an air-supply pipe 50. The pipes 47, $47^a$, $47^b$, and 50 all communicate with the casing 62 of the three-way valve. The form of the valve and its method of operation are clearly seen in Figs. VIII, IX, and X. On turning to the position shown in Fig. VIII, which is the same as that shown in Fig. VI, the air-pump 46 pumps air through pipe 47 through the three-way valve and through the pipe $47^a$ and $47^b$ into the reservoir 49. (A check-valve 64 in pipe $47^a$ prevents return movement of the air.) In this position the brake-cylinder 51 is open to the external atmosphere through pipe 50, and the port 65 of the three-way valve.

In the position of the three-way valve shown in Fig. IX air is pumped through pipe 47 and port 65 into the external atmosphere again. Pipes $47^a$ and $47^b$ are closed by the three-way valve and connection is made by the pipe 50 and port 66 of the three-way valve with the brake-cylinder. In this position the brake is on and the pump is working freely in the atmosphere without resistance. After the car has stopped with the three-way valve in this position by turning the valve to the position shown in Fig. VIII and releasing the brakes the back pressure of the compressed air in reservoir 49 is caused to react through pipes $47^a$, $47^b$, and 47 on the piston 45 and so accelerate the starting of the car.

In the position shown in Fig. X the pump is connected by the port 66 of the three-way valve with both the air-reservoir 49 and the air-brake cylinder 51, so as to supply air directly to both simultaneously, while the pipe $47^a$, although arranged opposite the open port 65 of the three-way valve, discharges no air therethrough owing to its retention by check-valve 64. With the valve in this position the back pressure of the reservoir-air acts automatically to start the piston 45 in action on the releasing of the brakes after the stopping of the car. The means for turning the three-way valve to either of these three positions are exhibited in Figs. VII and XI. The valve-staff extending through the top of its casing has a pinion 67, engaging with a rack 68 on a rod 69, which runs from end to end of the car, and is connected at each end to a lever 70, pivoted on the car-platform at 71 and adapted to be oscillated by a handle 72, which may be removed and carried from one platform to the other. The valve 56, controlling the whistle 55, is held normally in closed position by the spiral spring 73, and has a handle or lever 74, whose opposite ends have connected to them rods 75, leading to the opposite platforms of the car and there brought under the control of the operator by a lever similar to that shown in Fig. VII, or otherwise.

The improvements in the truck and motor herein described and illustrated are claimed in my divisional reissue application filed of even date with my present case. The air-pump-regulating devices and the air-brake system described are claimed in my application, Serial No. 473,583, filed May 9, 1893. Other parts of the mechanism herein illustrated and described are claimed in my application, Serial No. 461,928, filed February 11, 1893.

Having thus described my invention, what I claim, and desire to secure by Letters Patent, is—

1. In combination with a four-wheeled motor-truck and the frame thereof, and a motor carried thereby, speed-reducing gear connecting the armature-shaft of said motor with the axles and comprising an internal gear which has bearing on one of the bars of said truck-frame, as set forth.

2. The combination of the truck-frame, the motor-shaft, and the transmitting mechanism including the internal gear 19 having the sleeve 18 bearing in said frame, supporting said internal gear and affording bearing for the motor-shaft, substantially as set forth.

3. The combination of a motor, motor-shaft, the speed-reducing mechanism having the internal gear 19, sleeve 18 and pinion 30, the gear 31 engaging said pinion, and the yielding abutment connected with said gear 31, as set forth.

4. In an electric-railway car, the combination of a motor, differential transmitting mechanism from the shaft thereof to a car-axle, and a liquid abutment for controlling said differential transmitting mechanism and having suitable means whereby it is itself controlled by the operator, substantially as set forth.

5. In an electric-railway car, the combination of a motor, differential power-transmitting mechanism from the shaft thereof to a car-axle, one element of which may run freely or be arrested in order to control the movement of the car, and a liquid abutment, comprising a cylinder, piston and manually-controlled regulating-valve, connected to said element of the transmitting mechanism, substantially as set forth.

JOHN C. HENRY.

Witnesses:
MARY HAMPTON LLOYD,
JAMES A. KILTON.